(12) United States Patent
Pyun et al.

(10) Patent No.: US 9,213,312 B2
(45) Date of Patent: Dec. 15, 2015

(54) HOLOGRAPHIC 3D PRINTING APPARATUS AND METHOD OF DRIVING THE SAME

(75) Inventors: Kyoung-seok Pyun, Seoul (KR); Andrew Putilin, Moscow (RU); Alexander Morozov, Moscow (RU); Gee-young Sung, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 605 days.

(21) Appl. No.: 13/593,022

(22) Filed: Aug. 23, 2012

(65) Prior Publication Data

US 2013/0050789 A1    Feb. 28, 2013

(30) Foreign Application Priority Data

Aug. 24, 2011    (KR) .................. 10-2011-0084821

(51) Int. Cl.
*G03H 1/04*   (2006.01)
*G03H 1/16*   (2006.01)
(52) U.S. Cl.
CPC .............. *G03H 1/0476* (2013.01); *G03H 1/16* (2013.01); *G03H 2001/0482* (2013.01); *G03H 2210/22* (2013.01); *G03H 2223/16* (2013.01)
(58) Field of Classification Search
CPC .................................................... G03H 1/0476
See application file for complete search history.

(56) References Cited

U.S. PATENT DOCUMENTS

| 3,511,569 | A | * | 5/1970 | Mackta ........................... 356/28 |
| 6,266,167 | B1 | | 7/2001 | Klug et al. |
| 6,330,088 | B1 | | 12/2001 | Klug et al. |
| 6,661,548 | B2 | | 12/2003 | Klug et al. |
| 7,161,722 | B2 | | 1/2007 | Brotherton-Ratcliffe et al. |
| 7,813,018 | B2 | | 10/2010 | Klug et al. |
| 7,847,992 | B2 | | 12/2010 | Klug et al. |
| 2003/0137706 | A1 | * | 7/2003 | Rmanujam et al. ............. 359/34 |
| 2006/0098260 | A1 | | 5/2006 | Newswanger et al. |
| 2010/0149499 | A1 | | 6/2010 | Rodin et al. |

FOREIGN PATENT DOCUMENTS

KR    1999-0071670    9/1999
KR    10-2002-0074162    9/2002

OTHER PUBLICATIONS

"What 3D printing is" available at 3dprinting.com/what-is-3d-printing/#what is (Mar. 3, 2015).*

* cited by examiner

*Primary Examiner* — Jennifer L. Doak
(74) *Attorney, Agent, or Firm* — NSIP Law (57) ABSTRACT

A holographic three-dimensional (3D) printing apparatus and a method of driving the same are provided. The holographic 3D printing apparatus includes a light source configured to emit a beam, a beam splitting and expanding unit configured to split the emitted beam into a reference beam and a signal beam and expand the signal beam, an illumination unit configured to extract the expanded signal beam and collimate the extracted signal beam, a spatial light modulator (SLM) configured to modulate the collimated signal beam, an objective lens unit configured to emit the modulated signal beam to a holographic recording medium, and a reference beam forming unit configured to emit the reference beam to the holographic recording medium.

23 Claims, 4 Drawing Sheets

HOLOGRAPHIC 3D PRINTING APPARATUS AND METHOD OF DRIVING THE SAME

CROSS-REFERENCE TO RELATED APPLICATIONS

This application claims the benefit under 35 U.S.C. §119(a) of Korean Patent Application No. 10-2011-0084821, filed on Aug. 24, 2011, in the Korean Intellectual Property Office, the entire disclosure of which is incorporated herein by reference for all purposes.

BACKGROUND

1. Field

The following description relates to holographic three-dimensional (3D) printing apparatuses and methods of driving holographic 3D printing apparatuses.

2. Description of Related Art

As interest in three-dimensional (3D) stereoscopic images has increased, devices configured to display such stereoscopic images have been developed. Since high resolution stereoscopic images having a natural appearance may be made using holography, holographic 3D printing apparatuses have also been actively studied.

Holographic 3D printing apparatuses record 3D image information on a holographic recording medium, which is a photosensitive storage medium, as an interference pattern. An interference pattern is formed when a reference beam emitted from a light source interferes with a signal beam emitted from the light source. The interference pattern is recorded on a holographic recording medium by chemically or physically changing a holographic recording medium. When a holographic 3D printing apparatus is used to emit a reference beam to the holographic recording medium on which the interference pattern is recorded, a 3D stereoscopic image is reproduced from the holographic recording medium. Such holographic 3D printing apparatuses may be applied to holographic displays and stereoscopic image output devices used in homes or offices.

Figure 1:
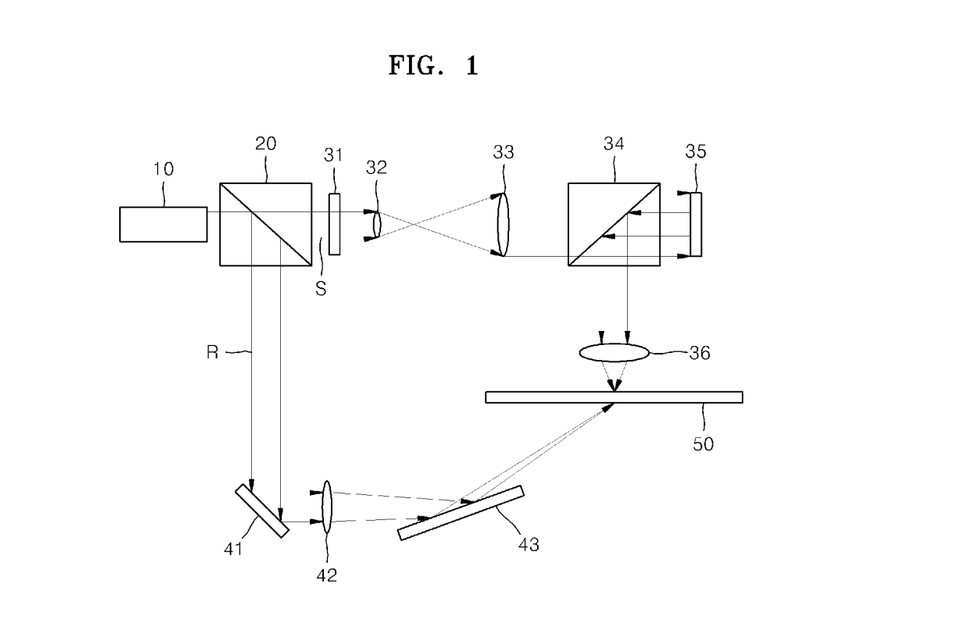
FIG. 1 is a plan view illustrating a general example of a holographic three-dimensional (3D) printing apparatus.

FIG. 1 is a plan view illustrating a general example of a holographic three-dimensional (3D) printing apparatus. Referring to the example illustrated in FIG. 1, a beam emitted from a light source 10 is split into a reference beam R and a signal beam S by a beam splitter 20. In an example, the light source 10 is a laser source for emitting a pulse laser beam. In another example, the beam splitter 20 is a polarizing beam splitter.

The signal beam S obtained by the beam splitter 20 is expanded while passing through a phase mask 31 and a predetermined lens 32. The expanded signal beam S passes through a collimating lens 33 and an illumination unit 34 and, thereafter, becomes incident on a spatial light modulator (SLM) 35 on which predetermined color information is displayed. The signal beam S modulated by the SLM 35 passes through an objective lens unit 36 and is emitted to a holographic recording medium 50. In an example, the illumination unit 34 is a polarizing beam splitter. In another example, the objective lens unit 36 is a Fourier objective lens.

The reference beam R obtained by the beam splitter 20 passes through a first reflection mirror 41, a lens 42, and a second reflection mirror 43, and is thereby emitted to the holographic recording medium 50. Accordingly, the signal beam S interferes with the reference beam R on the holographic recording medium 50 to record an interference pattern.

SUMMARY

In one general aspect, a holographic three-dimensional (3D) printing apparatus includes a light source configured to emit a beam, a beam splitting and expanding unit configured to split the emitted beam into a reference beam and a signal beam and expand the signal beam, an illumination unit configured to extract the expanded signal beam and collimate the extracted signal beam, a spatial light modulator (SLM) configured to modulate the collimated signal beam, an objective lens unit configured to emit the modulated signal beam to a holographic recording medium, and a reference beam forming unit configured to emit the reference beam to the holographic recording medium.

The holographic 3D printing apparatus may further include that the beam splitting and expanding unit, the illumination unit, and the objective lens unit include first, second, and third holographic optical elements, respectively.

The holographic 3D printing apparatus may further include that the first, second, and third holographic optical elements are on a first light guide member.

The holographic 3D printing apparatus may further include that the first holographic optical element is configured to expand the signal beam through the first light guide member to be incident on the second holographic optical element.

The holographic 3D printing apparatus may further include that the reference beam forming unit is further configured to adjust an optical delay of the reference beam to adjust a phase difference between the emitted reference beam and the emitted signal beam.

The holographic 3D printing apparatus may further include that the reference beam forming unit includes a second light guide member through which the reference beam passes.

The holographic 3D printing apparatus may further include that each of the first and second light guide members includes a transparent plate.

The holographic 3D printing apparatus may further include that either the second light guide member is spaced apart from the first light guide member or the second light guide member is in contact with the first light guide member.

The holographic 3D printing apparatus may further include that the holographic recording medium is between the first light guide member and the second light guide member.

The holographic 3D printing apparatus may further include that the first and second holographic optical elements are on a first surface of the first light guide member, and the third holographic optical element is on a second surface of the first light guide member.

The holographic 3D printing apparatus may further include that the light source and the SLM are adjacent to and spaced apart from the first holographic optical element and the second holographic optical element, respectively.

The holographic 3D printing apparatus may further include that the first holographic optical element is on a first surface of the first light guide member, and the second and third holographic optical elements are on a second surface of the first light guide member.

The holographic 3D printing apparatus may further include that the light source is disposed adjacent to and spaced apart from the first holographic optical element, and the SLM is on the first surface of the first light guide member.

The holographic 3D printing apparatus may further include that the light source includes a continuous wave (CW) laser source or a quasi-CW laser source.

In another general aspect, there is provided a method of driving a holographic three-dimensional (3D) printing apparatus, the holographic 3D printing apparatus including a light source, a beam splitting and expanding unit, an illumination unit, a spatial light modulator (SLM), an objective lens unit, and a reference beam forming unit, the method including emitting a beam from the light source, splitting the emitted beam into a reference beam and a signal beam via the beam splitting and expanding unit, expanding the signal beam via the beam splitting and expanding unit, extracting the expanded signal beam via the illumination unit, collimating the extracted signal beam via the illumination unit, modulating the collimated signal beam via the SLM, emitting the modulated signal beam from the objective lens unit to a holographic recording medium, and emitting the reference beam from the reference beam forming unit to the holographic recording medium.

The method may further include that the signal beam is expanded via the first holographic optical element through the first light guide member to be incident on the second holographic optical element.

The method may further include that emitting of the reference beam includes adjusting an optical delay of the reference beam via the reference beam forming unit to adjust a phase difference between the emitted reference beam and the emitted signal beam.

The method may further include that the emitted beam is a continuous wave (CW) laser beam or a quasi-CW laser beam.

Other features and aspects may be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

Figure 2:
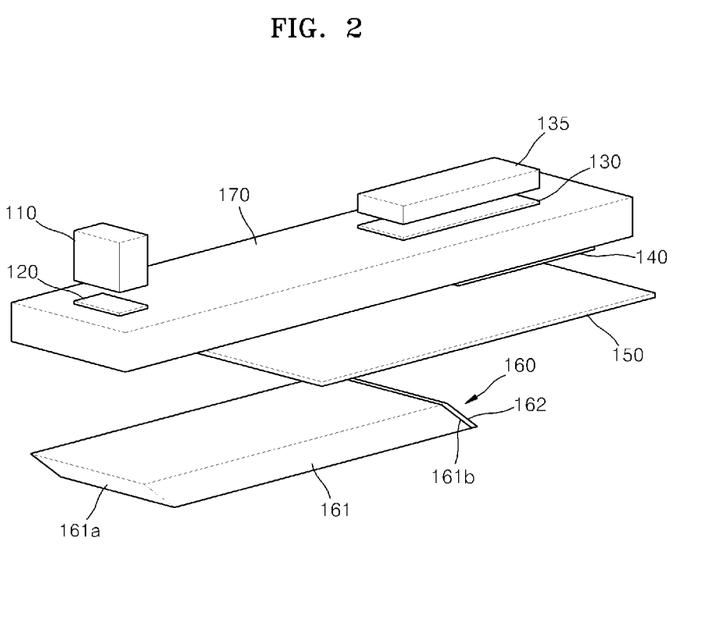
FIG. 2 is a perspective view illustrating an example of a holographic 3D printing apparatus.
Figure 3:
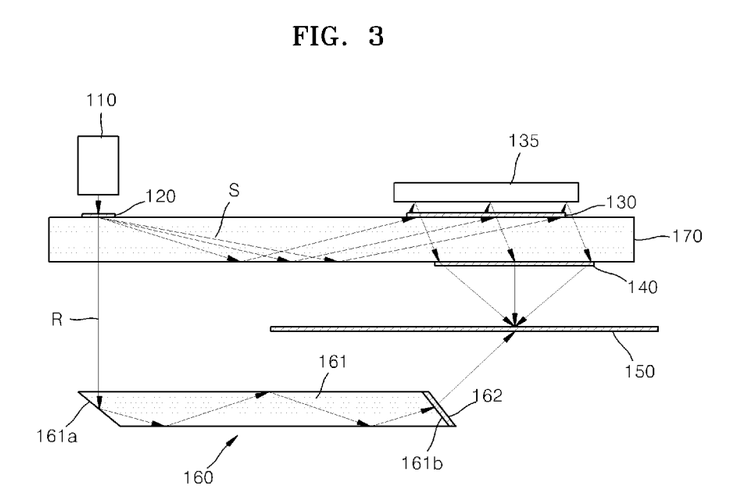
FIG. 3 is a cross-sectional view illustrating an example of the holographic 3D printing apparatus of FIG. 2.

FIG. 2 is a perspective view illustrating an example of a holographic 3D printing apparatus. FIG. 3 is a cross-sectional view illustrating an example of the holographic 3D printing apparatus of FIG. 2. Referring to examples illustrated in FIGS. 2 and 3, the holographic 3D printing apparatus includes a light source 110, a beam splitting and expanding unit 120, an illumination unit 130, an SLM 135, an objective lens unit 140, and a reference beam forming unit 160. The beam splitting and expanding unit 120 and the illumination unit 130 is disposed on a top surface of a first light guide member 170. The objective lens unit 140 is disposed on a bottom surface of the first light guide member 170.

In an example, the first light guide member 170, in which light is guided via total reflection, includes, for example, a transparent plate. In another example, the first light guide member 170 is formed of glass. In further examples, the first light guide member 170 is formed of any of various materials known to one of ordinary skill in the art to be used for guiding light by total reflection.

The light source 110 and the SLM 135 are disposed adjacent to and spaced apart from the beam splitting and expanding unit 120 and the illumination unit 130, respectively. That is, the light source 110 is disposed over the beam splitting and expanding unit 120, and the SLM 135 is disposed over the illumination unit 130. In an example, the light source 110 is a continuous wave (CW) laser source or a quasi-CW laser source. The beam splitting and expanding unit 120 splits a laser beam emitted from the light source 110 into a reference beam R and a signal beam S and expands the signal beam S.

In an example, the beam splitting and expanding unit 120 includes a first holographic optical element. In general, a holographic optical element is a diffractive optical element having a fine grating pattern manufactured using holography. In an example, the holographic optical element performs various optical functions according to the grating pattern. The first holographic optical element is configured to perform a beam splitting function and a beam expanding function. That is, in an example, when a laser beam emitted from the light source 110 is incident on the first holographic optical element, the laser beam is diffracted at a predetermined angle by the first holographic optical element, and is split into a signal beam S passing through the first light guide member 170 and a reference beam R transmitted through the first holographic optical element. In this example, the diffraction of the signal beam S results in the expansion of the signal beam S. Although a laser beam emitted from the light source 110 is perpendicularly incident on the first holographic optical element in FIG. 1, in yet another example, the laser beam is incident on the first holographic optical element obliquely at a predetermined angle.

The signal beam S is continuously expanded and totally reflected through the first light guide member 170 to have a desired size. The signal beam S having the desired size reaches the illumination unit 130 disposed on the top surface of the first light guide member 170. The illumination unit 130 extracts and collimates the signal beam S, and causes the signal beam S to be incident on the SLM 135.

In an example, the illumination unit 130 includes a second holographic optical element. A fine grating pattern configured to extract and collimate the signal beam S is formed on the second holographic optical element. Accordingly, when the signal beam S passing through the first light guide member 170 reaches the second holographic optical element, the second holographic optical element extracts and collimates the signal beam S from the first light guide member 170.

The signal beam S emitted through the illumination unit 130 is incident on the SLM 135 on which predetermined color information is displayed. The SLM 135 modulates the signal beam S incident thereon. The modulated signal beam S emitted from the SLM 135 passes through the first light guide member 170 from the SLM 135, and becomes incident on the objective lens unit 140. The objective lens unit 140 focuses the signal beam S emitted from the SLM 135 and emits the focused signal beam S to a desired position on the holographic recording medium 150.

In an example, the objective lens unit 140 includes a third holographic optical element. A fine grating pattern configured to perform a Fourier objective lens function is formed on the third holographic optical element. Accordingly, the signal beam S emitted from the SLM 135 through the first light guide member 170 is focused by the third holographic optical element and emitted to a desired position on the holographic recording medium 150. The holographic recording medium 150 is disposed, for example, under the first light guide member 170.

The reference beam forming unit 160 is disposed under the first light guide member 170 to be spaced apart from the first light guide member 170. While not being limited thereto, the holographic recording medium 150 is disposed between the first light guide member 170 and the reference beam forming unit 160. In an example, the hologram recording medium 150 is disposed at another position.

The reference beam forming unit 160 guides the reference beam R obtained by the beam splitting and expanding unit 120 and transmitted through the first light guide member 170 and emits the reference beam R to a desired position on the holographic recording medium 150. In addition, the reference beam forming unit 160 adjusts an optical delay of the reference beam R to adjust a phase difference between the reference beam R and the signal beam S.

The reference beam forming unit 160 includes a second light guide member 161. In an example, like the first light guide member 170, the second light guide member 161, in which light is guided via total reflection, includes, for example, a transparent plate. In another example, the second light guide member 161 is formed of glass. In further examples, the second light guide member 161 is formed of any of various materials known to one of ordinary skill in the art to be used for guiding light by total reflection.

In an example, a first side surface 161a of the second light guide member 161 is inclined. Accordingly, in this example, the reference beam R transmitted through the first light guide member 170 and incident on the second light guide member 161 is reflected by the first side surface 161a of the second light guide member 161 to pass through the second light guide member 161.

In another example, as the reference beam R passes through the second light guide member 161, an optical delay of the reference beam R is adjusted. Thus, in this example, a phase difference between the reference beam R and the signal beam S is adjusted.

In an example, a material layer 162 is disposed on a second side surface 161b of the second light guide member 161. The material layer 162 refracts the reference beam R passing through the second light guide member 161 at a predetermined angle, to cause the reference beam R to be emitted to a desired position on the holographic recording medium 150. In another example, while not being limited thereto, the second side surface 161b of the second light guide member 161 is inclined at a predetermined angle. Accordingly, the signal beam S interferes with the reference beam R on the holographic recording medium 150 to record an interference pattern.

According to the examples illustrated in FIGS. 2 and 3, each of the beam splitting and expanding unit 120, the illumination unit 130, and the reference beam forming unit 160 of the holographic 3D printing apparatus performs various functions to realize a holographic 3D printing apparatus having a compact structure. Further, in examples, each of the beam splitting and expanding unit 120, the illumination unit 130, and the objective lens unit 140 uses a holographic optical element.

Figure 4:
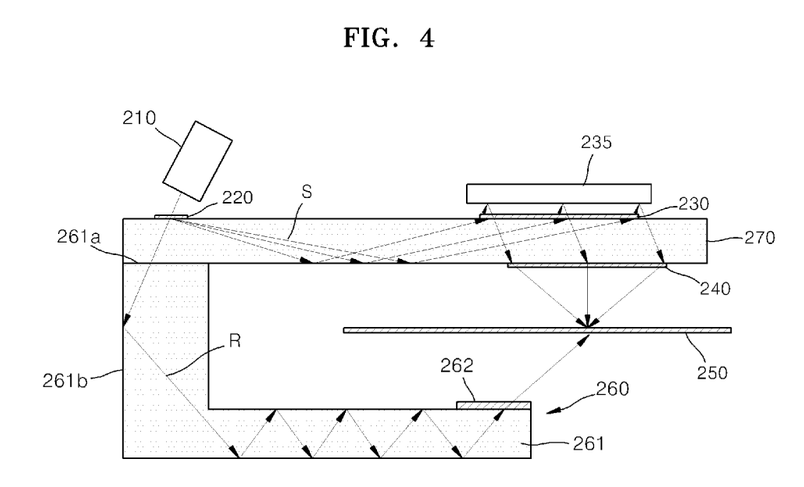
FIG. 4 is a cross-sectional view illustrating another example of a holographic 3D printing apparatus.

FIG. 4 is a cross-sectional view illustrating another example of a holographic 3D printing apparatus. Referring to the example illustrated in FIG. 4, a beam splitting and expanding unit 220 and an illumination unit 230 are spaced apart from each other on a top surface of a first light guide member 270. An objective lens unit 240 is disposed on a bottom surface of the first light guide member 270. In an example, the first light guide member 270 includes a transparent plate. A light source 210 is disposed over the beam splitting and expanding unit 220. An SLM 235 is disposed over the illumination unit 230.

In an example, the light source 210 is a laser source configured to emit a CW laser beam or a quasi-CW laser beam. In another example, the beam splitting and expanding unit 220 includes a first holographic optical element configured to split a laser beam emitted from the light source 210 into a reference beam R and a signal beam S and expand the signal beam S. The first holographic optical element is an optical element configured to perform both a beam splitting function and a beam expanding function. That is, in an example, when a laser beam emitted from the light source 210 is incident on the first holographic optical element, the laser beam is split into the signal beam S and the reference beam R and the signal beam S is expanded. In another example, the laser beam emitted from the light source 210 is incident on the first holographic optical element obliquely at a predetermined angle.

The signal beam S is continuously expanded and totally reflected through the first light guide member 270 to have a desired size. The signal beam S having the desired size reaches the illumination unit 230 disposed on the top surface of the first light guide member 270. The illumination unit 230 extracts and collimates the signal beam S, and then causes the signal beam S to be incident on the SLM 235.

In an example, the illumination unit 230 includes a second holographic optical element. A fine grating pattern configured to extract and collimate the signal beam S is formed on the second holographic optical element. Accordingly, when the signal beam S passing through the first light guide member 270 reaches the second holographic optical element, the second holographic optical element extracts and collimates the signal beam S from the first light guide member 270.

The signal beam S emitted through the illumination unit 230 is incident on the SLM 235 on which predetermined color information is displayed. The SLM 235 modulates the signal beam S incident thereon. The modulated signal beam S emitted from the SLM 235 passes through the first light guide member 270, and becomes incident on the objective lens unit 240.

In an example, the objective lens unit 240 includes a third holographic optical element configured to focus the modulated signal beam S emitted from the SLM 235 and emit the focused signal beam S to a desired position on a holographic recording medium 250. A fine grating pattern configured to perform a Fourier objective lens function is formed on the third holographic optical element. Accordingly, the modulated signal beam S emitted by the SLM 235 to pass through the first light guide member 270 is focused by the third holographic optical element and emitted to a desired position on the holographic recording medium 250. While not being limited thereto, the holographic recording medium 250 is disposed under the first light guide member 270.

A reference beam forming unit 260 is disposed under the first light guide member 270. While not being limited thereto, the holographic recording medium 250 is disposed between the first light guide member 270 and the reference beam forming unit 260. The reference beam forming unit 260 guides the reference beam R obtained by the beam splitting and expanding unit 220 and transmitted through the first light guide member 270 and emits the reference beam R to a desired position on the holographic recording medium 250. In addition, the reference beam forming unit 260 adjusts an optical delay of the reference beam R to adjust a phase difference between the reference beam R and the signal beam S. The reference beam forming unit 260 includes a second light guide member 261. In an example, the second light guide member 261 is formed of a transparent material, like the first light guide member 270.

A top surface 261a of a first side of the second light guide member 261 contacts the bottom surface of the first light guide member 270. In this example, the reference beam R obtained by the beam splitting and expanding unit 220 and transmitted through the first light guide member 270 is incident on the second light guide member 261, is reflected by a first side surface 261b of the second light guide member 261, and passes through the second light guide member 261. In an example, due to the second light guide member 261, an optical delay of the reference beam R and a phase difference between the reference beam R and the signal beam S are adjusted.

A material layer 262 is disposed on the second light guide member 261. In an example, the material layer 262 refracts the reference beam R passing through the second light guide member 261 at a predetermined angle and causes the reference beam R to be emitted to a desired position on the holographic recording medium 250. Accordingly, the signal beam S and the reference beam R interfere with each other on the holographic recording medium 250 to record an interference pattern.

Figure 5:
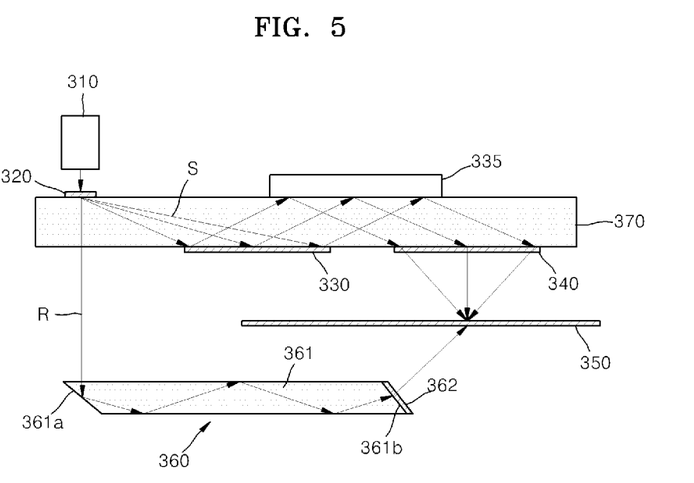
FIG. 5 is a cross-sectional view illustrating yet another example of a holographic 3D printing apparatus.

FIG. 5 is a cross-sectional view illustrating yet another example of a holographic 3D printing apparatus. Referring to the example illustrated in FIG. 5, a beam splitting and expanding unit 320 is disposed on a top surface of a first light guide member 370, and an illumination unit 330 and an objective lens unit 340 is disposed on a bottom surface of the first light guide member 370 to be spaced apart from each other. In an example, the first light guide member 370 includes a transparent plate. A light source 310 is disposed over the beam splitting and expanding unit 320. In another example, the light source 310 is a laser source configured to emit a CW laser beam or a quasi-CW laser beam. An SLM 335 is disposed on the top surface of the first light guide member 370 between the illumination unit 330 and the objective lens unit 340.

In an example, the beam splitting and expanding unit 320 includes a first holographic optical element configured to split a laser beam emitted from the light source 310 into a reference beam R and a signal beam S and expand the signal beam S. The first holographic optical element is an optical element configured to perform both a beam splitting function and a beam expanding function. That is, when a laser beam emitted from the light source 310 is incident on the first holographic optical element, the laser beam is split into the signal beam S and the reference beam R and the signal beam S is expanded by being diffracted. In another example, the laser beam emitted from the light source 310 is incident on the first holographic optical element perpendicularly or obliquely at a predetermined angle.

The signal beam S is continuously expanded while passing through the first light guide member 370 to have a desired size, and the signal beam S having the desired size reaches the illumination unit 330 disposed on the bottom surface of the first light guide member 370. The illumination unit 330 extracts and collimates the signal beam S passing through the first light guide member 370 and causes the signal beam S to be incident on the SLM 335.

In an example, the illumination unit 330 includes a second holographic optical element. When the signal beam S passing through the first light guide member 370 reaches the second holographic optical element, the second holographic optical element extracts and collimates the signal beam S from the first light guide member 370.

The signal beam S emitted through the illumination unit 330 passes through the first light guide member 370 and is incident on the SLM 335 disposed on the top surface of the first light guide member 370. The signal beam S is modulated by the SLM 335, passes through the first light guide member 370, and is incident on the objective lens unit 340 disposed on the bottom surface of the first light guide member 370.

In an example, the objective lens unit 340 includes a third holographic optical element configured to focus the signal beam S emitted from the SLM 335 and emit the signal beam S to a desired position on the holographic recording medium 350. The signal beam S modulated by the SLM 335 and passing through the first light guide member 370 is focused by the third holographic optical element and emitted to a desired position on the holographic recording medium 350. While not being limited thereto, the holographic recording medium 350 is disposed under the first light guide member 370.

While not being limited thereto, a reference beam forming unit 360 is disposed under the first light guide member 370 to be spaced apart from the first light guide member 370. In addition, while not being limited thereto, the holographic recording medium 350 is disposed between the first light guide member 370 and the reference beam forming unit 360.

The reference beam forming unit 360 guides the reference beam R obtained by the beam splitting and expanding unit 320 and passing through the first light guide member 370 and emits the reference beam R to a desired position on the holographic recording medium 350. In addition, the reference beam forming unit 360 adjusts an optical delay of the reference beam R to adjust a phase difference between the reference beam R and the signal beam S. While not being limited thereto, the reference beam forming unit 360 includes a second light guide member 361. In an example, the second light guide member 361 includes a transparent plate, like the first light guide member 370.

In an example, a first side surface 361a of the second light guide member 361 is inclined. Accordingly, in another example, the reference beam R passing through the first light guide member 370 and incident on the second light guide member 361 is reflected by the first side surface 361a of the second light guide member 361 and passes through the second light guide member 361. Due to the second light guide member 361, in yet another example, an optical delay of the reference beam R is adjusted to adjust a phase difference between the reference beam R and the signal beam S.

A material layer 362 is disposed on a second side surface 361b of the second light guide member 361. In an example, the material layer 362 refracts the reference beam R passing through the second light guide member 361 at a predetermined angle and causes the reference beam R to be emitted to a desired position on the holographic recording medium 350. While not being limited thereto, in another example, the second side surface 361b of the second light guide member 361 is inclined. Accordingly, the signal beam S and the reference beam R interfere with each other on the holographic recording medium 350 to record an interference pattern.

Figure 6:
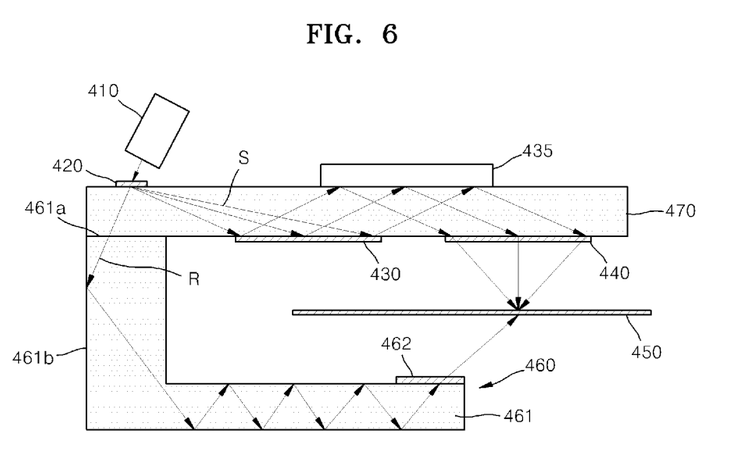
FIG. 6 is a cross-sectional view illustrating still another example of a holographic 3D printing apparatus.

FIG. 6 is a cross-sectional view illustrating still another example of a holographic 3D printing apparatus. Referring to the example illustrated in FIG. 6, a beam splitting and expanding unit 420 is disposed on a top surface of a first light guide member 470, and an illumination unit 430 and an objective lens unit 440 is disposed on a bottom surface of the first light guide member 470 to be spaced apart from each other. A light source 410 is disposed over the beam splitting and expanding unit 420. In an example, the light source 410 is a laser source configured to emit a CW laser beam or a quasi-CW laser beam. An SLM 435 is disposed on the top surface of the first light guide member 470 between the illumination unit 430 and the objective lens unit 440.

In an example, the beam splitting and expanding unit 420 includes a first holographic optical element configured to split a laser beam emitted from the light source 410 into a reference beam R and a signal beam S and expand the signal beam S. The first holographic optical element is an optical element configured to perform both a beam splitting function and a beam expanding function. That is, when a laser beam emitted from the light source 410 is incident on the first holographic optical element, the laser beam is split into the signal beam S and the reference beam R by the first holographic optical element, and the signal beam S is expanded by being diffracted. In another example, the laser beam emitted from the light source 410 is incident on the first holographic optical element obliquely at a predetermined angle.

The signal beam S is continuously expanded while passing through the first light guide member 470 to have a desired size, and the signal beam S having the desired size reaches the illumination unit 430 disposed on the bottom surface of the first light guide member 470. In an example, the illumination unit 430 includes a second holographic optical element configured to extract and collimate the signal beam S passing through the first light guide member 470, thereby causing the signal beam S to be incident on the SLM 435. When the signal beam S passing through the first light guide member 470 reaches the second holographic optical element, the second holographic optical element extracts and collimates the signal beam S from the first light guide member 470.

The signal beam S emitted through the illumination unit 430 passes through the first light guide member 470, and is incident on the SLM 435 disposed on the top surface of the first light guide member 470. The signal beam S is modulated by the SLM 435, passes through the first light guide member 470, and is incident on the objective lens unit 440 disposed on the bottom surface of the first light guide member 470. In an example, the objective lens unit 440 includes a third holographic optical element configured to focus the signal beam S emitted from the SLM 435 and emit the signal beam S to a desired position on a holographic recording medium 450. The signal beam S modulated by the SLM 435 and passing through the first light guide member 470 is focused by the third holographic optical element and is emitted to a desired position on the holographic recording medium 450. While not being limited thereto, the holographic recording medium 450 is disposed under the first light guide member 470.

While not being limited thereto, a reference beam forming unit 460 is disposed under the first light guide member 470, and the holographic recording medium 450 is disposed between the first light guide member 470 and the reference beam forming unit 460. The reference beam forming unit 460 guides the reference beam R obtained by the beam splitting and expanding unit 420 and passing through the first light guide member 470 and emits the reference beam R to a desired position on the holographic recording medium 450. In addition, the reference beam forming unit 460 adjusts an optical delay of the reference beam R to adjust a phase difference between the reference beam R and the signal beam S. While not being limited thereto, the reference beam forming unit 460 includes a second light guide member 461 that, in an example, is formed of a transparent material, like the first light guide member 470.

While not being limited thereto, a top surface 461a of a first side of the second light guide member 461 contacts the bottom surface of the first light guide member 470. In this case, in an example, the reference beam R obtained by the beam splitting and expanding unit 420 and passing through the first light guide member 470 is incident on the second light guide member 461, is reflected by a first side surface 461b of the second light guide member 461, and passes through the second light guide member 461. Due to the second light guide member 461, in another example, an optical delay of the reference beam R is adjusted to adjust a phase difference between the reference beam R and the signal beam S. While not being limited thereto, a material layer 462 is disposed on the second light guide member 461. In an example, the material layer 462 refracts the reference beam R passing through the second light guide member 461 at a predetermined angle, and causes the reference beam R to be emitted to a desired position on the holographic recording medium 450. Accordingly, the signal beam S and the reference beam R interfere with each other on the holographic recording medium 450 to record an interference pattern.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A holographic three-dimensional (3D) recording apparatus, comprising:
 a light source configured to emit a beam;
 a beam splitting and expanding unit, comprising a first holographic optical element, configured to split the emitted beam into a reference beam and a signal beam and expand the signal beam;
 an illumination unit, comprising a second holographic optical element, configured to extract the expanded signal beam and collimate the extracted signal beam;
 a spatial light modulator (SLM) configured to modulate the collimated signal beam;
 an objective lens, comprising a second holographic optical element, unit configured to emit the modulated signal beam to a holographic recording medium; and
 a reference beam forming unit configured to emit the reference beam to the holographic recording medium,
 wherein the first, second, and third holographic optical elements are on a first light guide member.

2. The holographic 3D recording apparatus of claim 1, wherein the first holographic optical element is configured to expand the signal beam through the first light guide member to be incident on the second holographic optical element.

3. The holographic 3D recording apparatus of claim 1, wherein the reference beam forming unit is further configured to adjust an optical delay of the reference beam to adjust a phase difference between the emitted reference beam and the emitted signal beam.

4. The holographic 3D recording apparatus of claim 3, wherein the reference beam forming unit comprises a second light guide member through which the reference beam passes.

5. The holographic 3D recording apparatus of claim 4, wherein each of the first and second light guide members comprises a transparent plate.

6. The holographic 3D recording apparatus of claim 4, wherein either the second light guide member is spaced apart from the first light guide member or the second light guide member is in contact with the first light guide member.

7. The holographic 3D recording apparatus of claim 4, wherein the holographic recording medium is between the first light guide member and the second light guide member.

8. The holographic 3D recording apparatus of claim 1, wherein the first and second holographic optical elements are on a first surface of the first light guide member, and wherein the third holographic optical element is on a second surface of the first light guide member.

9. The holographic 3D recording apparatus of claim 8, wherein the light source and the SLM are adjacent to and spaced apart from the first holographic optical element and the second holographic optical element, respectively.

10. The holographic 3D recording apparatus of claim 1, wherein the first holographic optical element is on a first surface of the first light guide member, and wherein the second and third holographic optical elements are on a second surface of the first light guide member.

11. The holographic 3D recording apparatus of claim 10, wherein the light source is disposed adjacent to and spaced apart from the first holographic optical element, and wherein the SLM is on the first surface of the first light guide member.

12. The holographic 3D recording apparatus of claim 1, wherein the light source comprises a continuous wave (CW) laser source or a quasi-CW laser source.

13. A method of driving a holographic three-dimensional (3D) recording apparatus, the holographic 3D recording apparatus comprising a light source, a beam splitting and expanding unit, an illumination unit, a spatial light modulator (SLM), an objective lens unit, and a reference beam forming unit, the method comprising:

emitting a beam from the light source;

splitting the emitted beam into a reference beam and a signal beam via the beam splitting and expanding unit, which comprises a first holographic optical element;

expanding the signal beam via the beam splitting and expanding unit;

extracting the expanded signal beam via the illumination unit, which comprises a second holographic optical element;

collimating the extracted signal beam via the illumination unit;

modulating the collimated signal beam via the SLM;

emitting the modulated signal beam from the objective lens unit, which comprises a third holographic optical element, to a holographic recording medium; and emitting the reference beam from the reference beam forming unit to the holographic recording medium, wherein the first, second, and third holographic optical elements are on a first light guide member.

14. The method of claim 13, wherein the signal beam is expanded via the first holographic optical element through the first light guide member to be incident on the second holographic optical element.

15. The method of claim 13, wherein emitting of the reference beam comprises adjusting an optical delay of the reference beam via the reference beam forming unit to adjust a phase difference between the emitted reference beam and the emitted signal beam.

16. The method of claim 15, wherein the reference beam forming unit comprises a second light guide member through which the reference beam passes.

17. The method of claim 16, wherein either the second light guide member is spaced apart from the first light guide member or the second light guide member is in contact with the first light guide member.

18. The method of claim 16, wherein the holographic recording medium is between the first light guide member and the second light guide member.

19. The method of claim 13, wherein the first and second holographic optical elements are on a first surface of the first light guide member, and wherein the third holographic optical element is on a second surface of the first light guide member.

20. The method of claim 19, wherein the light source and the SLM are adjacent to and spaced apart from the first holographic optical element and the second holographic optical element, respectively.

21. The method of claim 13, wherein the first holographic optical element is on a first surface of the first light guide member, and wherein the second and third holographic optical elements are on a second surface of the first light guide member.

22. The method of claim 21, wherein the light source is disposed adjacent to and spaced apart from the first holographic optical element, and wherein the SLM is on the first surface of the first light guide member.

23. The method of claim 13, wherein the emitted beam is a continuous wave (CW) laser beam or a quasi-CW laser beam.

* * * * *